United States Patent [19]
Okada et al.

[11] Patent Number: 5,517,996
[45] Date of Patent: May 21, 1996

[54] ULTRASONIC DIAGNOSTIC APPARATUS

[75] Inventors: Kazutaka Okada, Iwatsuki; Akira Sasaki, Ichikawa; Hiroshi Kanda, Tokorozawa, all of Japan

[73] Assignee: Hitachi Medical Corporation, Tokyo, Japan

[21] Appl. No.: 400,841

[22] Filed: Mar. 8, 1995

[30] Foreign Application Priority Data

Apr. 21, 1994 [JP] Japan ................................. 6-105044

[51] Int. Cl.$^6$ ................................................ A61B 8/00
[52] U.S. Cl. ................................................ 128/661.01
[58] Field of Search ...................... 128/660.07, 660.08, 128/661.01; 73/625, 626, 641

[56] References Cited

U.S. PATENT DOCUMENTS

| | | | |
|---|---|---|---|
| 4,442,715 | 4/1984 | Brisken et al. | 128/661.01 |
| 4,470,305 | 9/1984 | O'Donnell | 128/661.01 |

*Primary Examiner*—George Manuel
*Attorney, Agent, or Firm*—Antonelli, Terry, Stout & Kraus

[57] ABSTRACT

A memory for temporarily storing a transmitting signal is provided in association with each channel i.e., each transducer of a probe, a transmitting signal for transmitting an ultrasonic wave of a desired waveform is formed through a computer processing, and the thus formed transmitting signal is stored in each memory. Transmitting signals are sent simultaneously to individual channels from individual memories. This ensures that a transmitting signal of a desired waveform can be applied to each channel and the transmission of an ultrasonic wave can be controlled desirably.

16 Claims, 6 Drawing Sheets

ULTRASONIC DIAGNOSTIC APPARATUS

BACKGROUND OF THE INVENTION

The present invention relates to an ultrasonic diagnostic apparatus which transmits and receives an ultrasonic wave to and from an object to be examined so as to obtain an ultrasonic image of a region of interest and more particularly to an ultrasonic diagnostic apparatus which can drive a probe with a desired transmitting waveform to cause the probe to transmit an ultrasonic wave.

As shown in FIG. 1, a conventional ultrasonic diagnostic apparatus comprises a probe 1 having a great number of transducers arrayed to form multiple channels and adapted to transmit and receive an ultrasonic wave to and from an object to be examined, an ultrasonic wave transmitting circuit 6 for supplying an ultrasonic wave transmitting signal to the probe 1, a receiving beamforming circuit 3 for performing receiving beamforming by amplifying an ultrasonic receiving signal from the probe 1 and applying an amplified signal with a predetermined delay, an image processing circuit 4 for applying a predetermined processing to an output signal from the receiving beamforming circuit 3 so as to form an image signal, and an image display 5 for displaying the image signal from the image processing circuit 4.

In the ultrasonic wave transmitting circuit 6, its internal transmitting pulse generating circuit 7 generates an ultrasonic transmitting pulse for each transducer, the ultrasonic transmitting pulse is converted into a high voltage transmitting pulse by means of a driver circuit 8 and the high voltage transmitting pulse drives each channel, that is, each transducer or a pair of transducers, of the probe 1, thus causing the probe 1 to generate an ultrasonic wave. The receiving beamforming circuit 3 receives an echo signal reflected from an object to be examined and received by each transducer of the probe 1, amplifies the received echo signal, applies the amplified signal with a predetermined delay and adds signals of the respective channels together. In the image processing circuit 4, a resultant signal is subjected to a signal processing such as logarithmic compression and detection and converted into an image signal such as a television signal. The image display 5 displays the image signal as an ultrasonic image.

The driver circuit 8 included in the ultrasonic wave transmitting circuit 6 is exemplified in a circuit diagram of FIG. 2. In this circuit, an N-MOSFET, a P-MOSFET, a resistor R and a capacitor C are used and with a signal applied from a digital circuit of low voltage, for example, 5 V system to the input, a +V power supply is subjected to switching to generate a pulse of high voltage. The delivered high voltage pulse is sent to the probe 1 shown in FIG. 1 to drive the same. In order that an object to be examined can be prevented, for safety, from being applied with an excessively large ultrasonic wave, power of ultrasonic transmitting wave is controlled by changing voltage of the +V power supply to change the amplitude of the high voltage pulse to be delivered.

In the conventional ultrasonic diagnostic apparatus constructed as above, however, the FIG. 2 driver circuit 8 included in the ultrasonic wave transmitting circuit 6 generates a high voltage pulse for transmission by merely switching the high voltage +V power supply by means of switching elements such as the N-MOSFET and P-MOSFET and hence, the circuit 8 can generate only a high voltage pulse of fixed waveform which is of a substantially rectangular waveform, failing to generate a high voltage pulse of a desired waveform. Namely, the amplitude of each wave of an ultrasonic transmitting signal consisting of five waves as shown in FIG. 2 cannot be changed desirably. Further, in the circuit of FIG. 2, the amplitude of the high voltage pulse is changed by changing voltage of the high voltage +V power supply but the smoothing capacitor C for the +V power supply prevents voltage from changing at a high speed and so the amplitude cannot be changed at a high speed. For the above reasons, the transmitting wave cannot be controlled in amplitude, frequency, wave number and waveform independently for the respective channels of the probe 1 depending on the modes of monochromatic tomographic image and Doppler image and consequently, irregularity in sensitivity of transducer prevailing between one channel and another cannot be eliminated and besides individual channels cannot be weighted in terms of sensitivity. Further, since ultrasonic waves cannot be transmitted simultaneously in a plurality of scanning line directions, transmission of waves must be switched alternately in accordance with the modes of monochromatic tomographic image and Doppler image and the frame rate of an obtained ultrasonic image is degraded.

SUMMARY OF THE INVENTION

An object of the present invention is to solve at least one of the above problems. Another object of the invention is to provide an ultrasonic diagnostic apparatus in which ultrasonic waves of desired waveforms can be transmitted from individual channels of a probe.

To accomplish the above objects, according to an embodiment of the present invention, a memory for temporarily storing a transmitting signal is provided in association with each channel i.e., each transducer of a probe, a transmitting signal necessary to transmit an ultrasonic wave of a desired waveform is formed through a computer processing and the thus formed transmitting signal is stored in each memory. Then, the transmitting signals are sent simultaneously from the individual memories to the channels. With this construction, the transmitting signals of desired waveforms can be applied to the individual channels, so that transmission of ultrasonic waves can be controlled desirably.

As will be seen from FIG. 2, it is possible in the prior art that the width of a unit pulse of a high voltage pulse, that is, the interval between adjacent peaks of a transmitting signal having a plurality of peaks can be changed desirably and independently. But, voltage of the +V power supply cannot be changed at a high speed and consequently, the amplitude of each peak cannot be controlled desirably and independently.

Contrary to this, according to the present invention, the waveform of an ultrasonic wave transmitting signal can be determined desirably through a computer processing.

Further, since the memories for storing transmitting signals are provided in association with the individual channels, transmitting signals to be applied to the individual channels can be controlled independently.

In the prior art, the waveform of a transmitting signal is determined by the driver circuit 8 shown in FIG. 2. Since it is not practical to make the driver circuits different for the individual channels or to provide a plurality of driver circuits for each channel, it has hitherto been general that transmitting signals of the same waveform are applied to the individual channels. Namely, transmitting signals having waveforms which are different for the individual channels cannot be applied thereto.

BRIEF DESCRIPTION OF THE DRAWINGS

These and other object and technical advantages of the present invention will be readily apparent from the following description of the preferred exemplary embodiments of the invention in conjunction with the accompanying drawings, in which.

DESCRIPTION OF THE PREFERRED EMBODIMENTS

Embodiments of the present invention will now be described with reference to the accompanying drawings.

Figure 3:
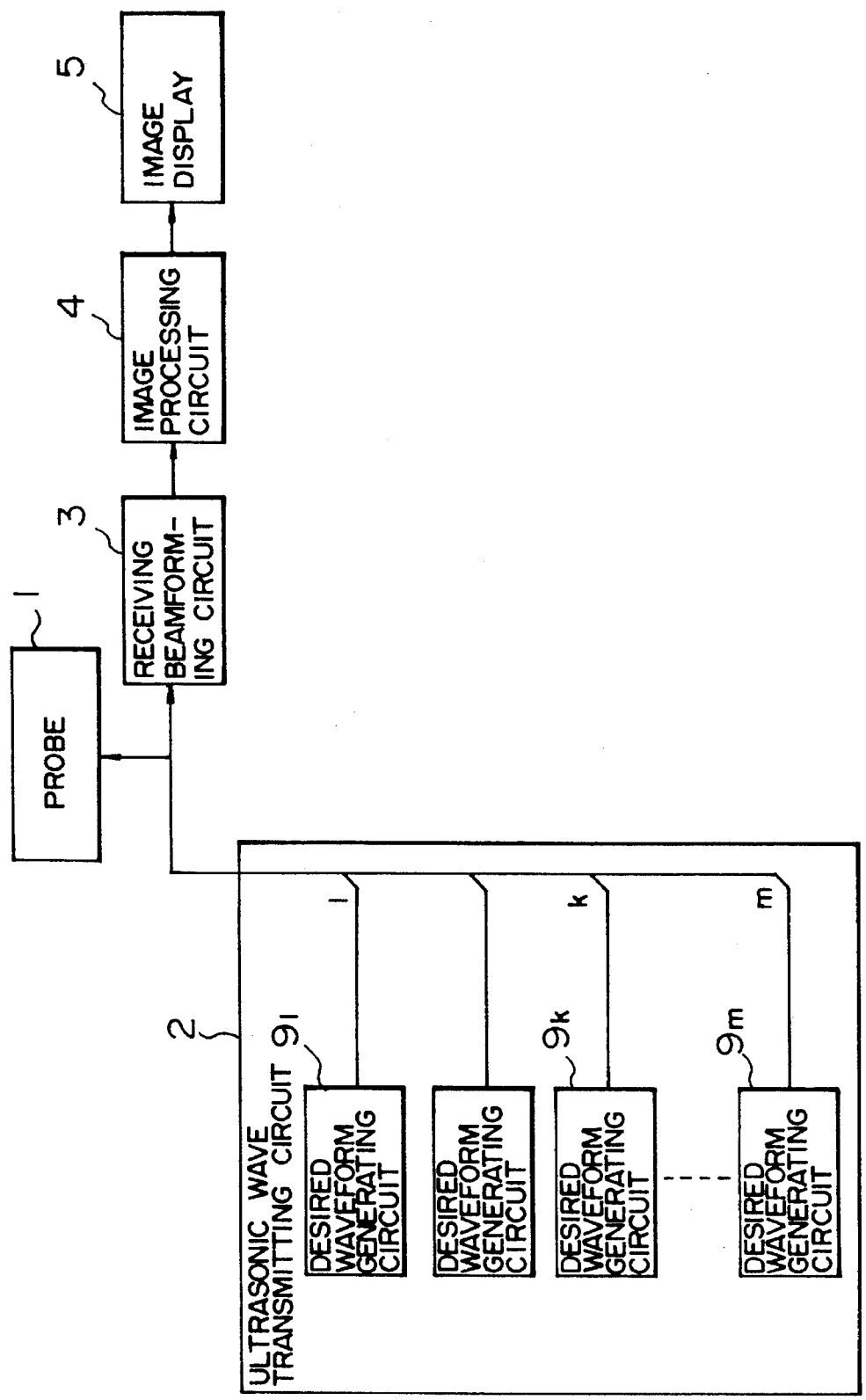
FIG. 3 is a block diagram showing an embodiment of an ultrasonic diagnostic apparatus according to the present invention.

FIG. 3 is a block diagram showing an embodiment of an ultrasonic diagnostic apparatus according to the present invention. The ultrasonic diagnostic apparatus transmits and receives an ultrasonic wave to and from an object to be examined so as to form and display an ultrasonic image of a region of interest (diagnostic region) and as shown in FIG. 3, it has a probe 1, an ultrasonic wave transmitting circuit 2, a receiving beamforming circuit 3, an image processing circuit 4 and an image display 5.

The probe 1 is adapted to transmit and receive an ultrasonic wave to and from an object to be examined and includes a great number of transducers arrayed in line to form multiple channels, each transducer having the form of, for example, a strip. The ultrasonic wave transmitting circuit 2 supplies an ultrasonic wave transmitting signal to the probe 1 to drive it. The receiving beamforming circuit 3 performs receiving beamforming by amplifying an ultrasonic receiving signal delivered out of the probe 1 and applying an amplified signal with a predetermined delay. More specifically, the receiving beamforming circuit 3 receives and amplifies an echo signal which is reflected from an object to be examined and is received by each transducer of the probe 1, applies an amplified signal with a predetermined delay time and adds the receiving signals of individual channels to each other. The image processing circuit 4 forms an image signal by applying a predetermined processing to an output signal from the receiving beamforming circuit 3. For example, the output signal undergoes such a signal processing as logarithmic compression and detection so as to be converted into an image signal such as a television signal. The image display 5 displays the image signal from the image processing circuit 4 to provide an ultrasonic image and it includes, for example, a television monitor.

In accordance with the present invention, the ultrasonic wave transmitting circuit 2 has internal components in the form of desired waveform generating circuits $9_1$–$9_m$ which are provided in association with respective channels (1 to m) of the probe 1 to independently prepare desired transmitting waveforms for the respective channels of the probe 1 and drive the probe 1 with the transmitting waveforms. The transmitting waveforms prepared by the desired waveform generating circuits $9_1$–$9_m$ are sent to transducers of the respective channels of the probe 1, so that the probe 1 is driven to transmit ultrasonic waves.

Figure 4:
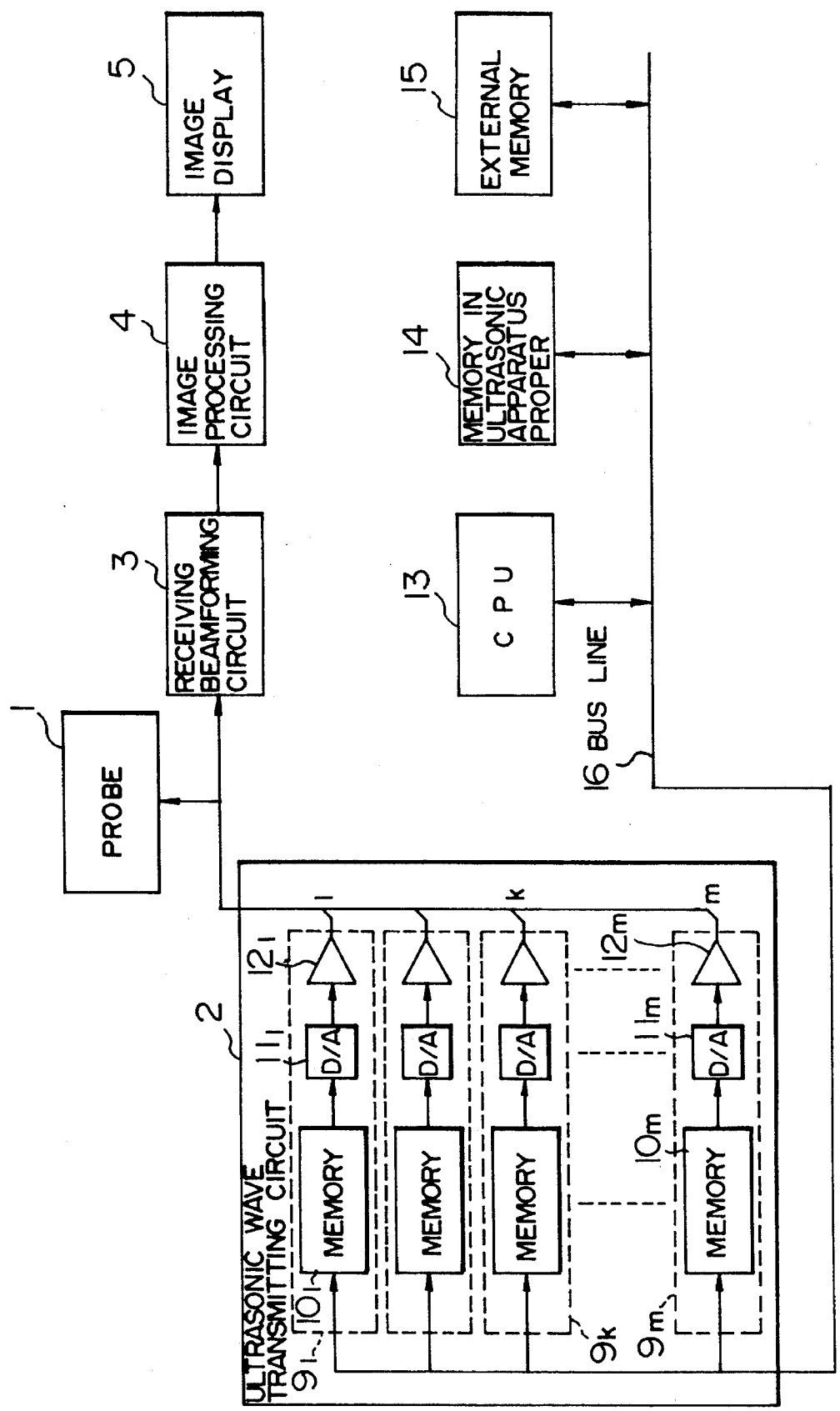
FIG. 4 is a block diagram for revealing a concrete internal structure of a desired waveform generating circuit.
Figure 5:
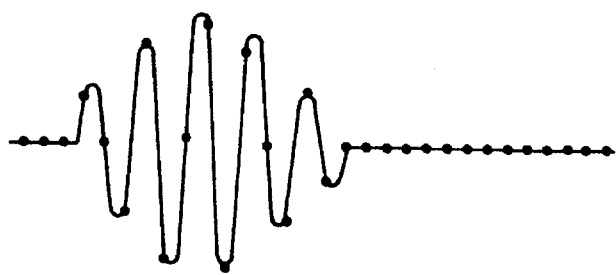
FIG. 5 is a diagram for explaining an example of a transmitting waveform prepared by the desired waveform generating circuit.

FIG. 4 reveals a concrete internal structure of the desired waveform generating circuit 9 of the ultrasonic wave transmitting circuit 2 shown in FIG. 3. More particularly, the desired waveform generating circuits 9 includes a memory 10, a D/A converter 11 and a fixed gain amplifier 12. The memory 10 is adapted to record data representative of transmitting waves which are changed in amplitude, frequency, wave number and waveform for respective channels of the probe 1 depending on the modes of monochromatic tomographic image and Doppler image and data representative of a plurality of scanning line directions. For example, the memory 10 is comprised of a RAM and writes or reads data indicative of a transmitting waveform as shown in FIG. 5 at constant intervals. The D/A converter 11 receives the data indicative of a transmitting waveform read out of the memory 10 to convert the received data into an analog signal. The fixed gain amplifier 12 receives the analog signal delivered out of the D/A converter 11 and amplifies the received signal at a constant gain to convert it into a high voltage signal. The high voltage signal delivered out of the fixed gain amplifier 12 is then sent to each channel of the probe 1.

Data of a desired transmitting waveform to be recorded on the memory 10 included in the desired waveform generating circuit 9 is transferred from a central processing unit (CPU) 13 provided exteriorly of the ultrasonic wave transmitting circuit 2 through a bus line 16. The CPU 13 prepares data of a desired transmitting waveform in accordance with a program provided interiorly of the CPU 13. More specifically, transmitting waveform data formed by the CPU 13 is sequentially written into all or selected ones of the memories $10_1$ to $10_n$. At that time, data written into the individual memories may be the same for all of the memories or may be different for each memory. Data stored in the respective memories are discharged simultaneously at predetermined timings to produce ultrasonic wave transmitting signals. Consequently, ultrasonic waves having waveforms corresponding to those of the wave transmitting signals are transmitted from the individual transducers, that is, the individual channels of the probe.

The transmitting waveform data formed for each channel in this manner is stored in an internal memory 14 and/or an external memory 15 together with observation conditions (the type of the probe and other information). When coincidence of the stored observation conditions with inputted observation conditions takes place, data stored in the CPU 13 is read so as to be used again.

The memory 14 in the ultrasonic apparatus proper is constructed of, for example, a ROM or RAM. The external memory 15 adapted to store data of a desired transmitting waveform or other data is constructed of, for example, a floppy disc or hard disc. The CPU 13 also controls other elements.

In the present embodiment, the circuits 3 and 4 and display 5 can be those of an ultrasonic diagnostic apparatus (type: EVB-565A or EVB-555) presented by Hitachi Medical Corporation; and also, the probe can be one (type: EVP-F334) presented by the same corporation.

Figure 1:
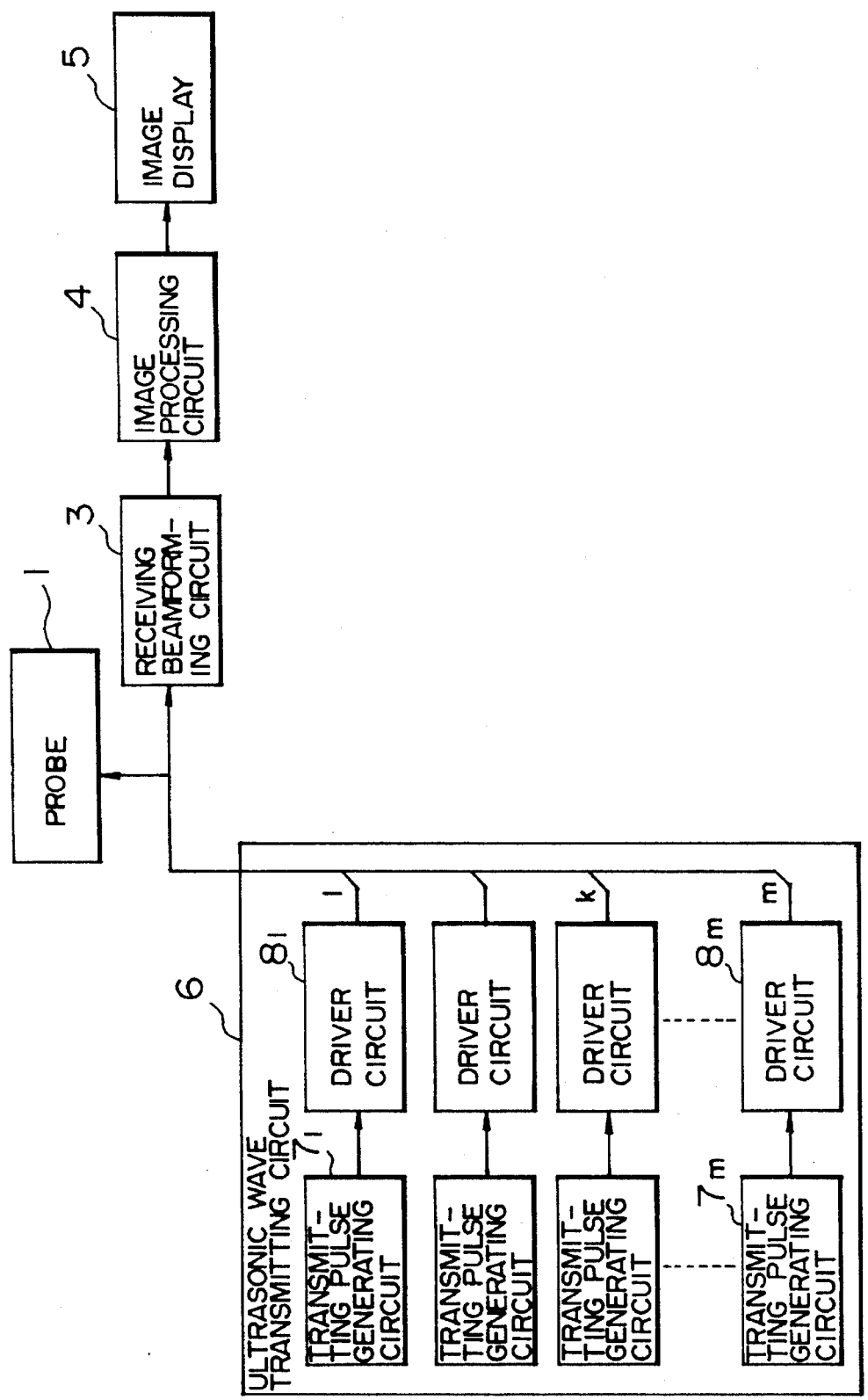
FIG. 1 is a block diagram showing the construction of a prior art ultrasonic diagnostic apparatus.
Figure 2:
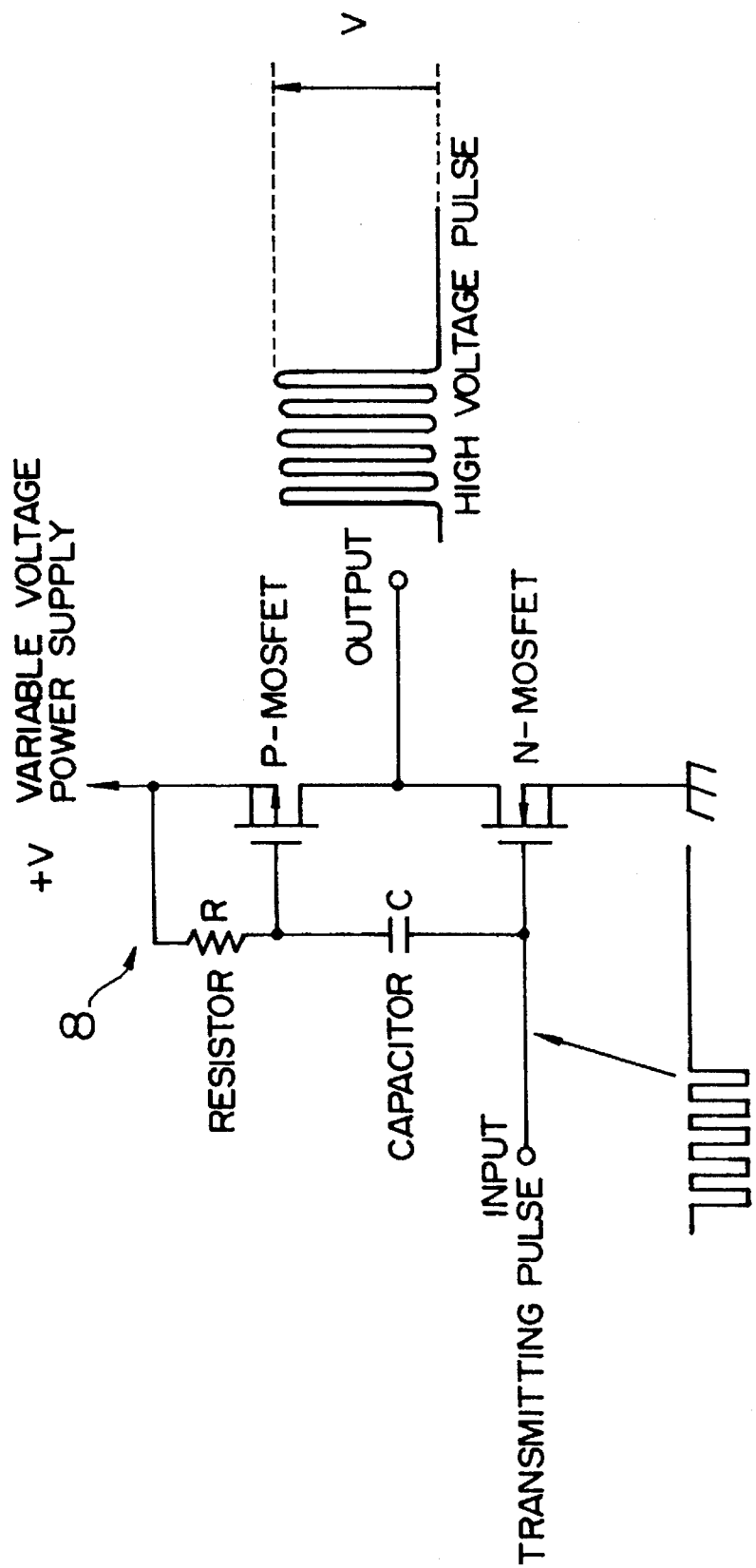
FIG. 2 is a circuit diagram of a driver circuit.
Figure 6A:
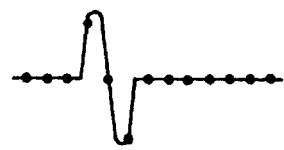
FIGS. 6A to 6D are diagrams for explaining examples of desired transmitting waveforms which can be prepared by the desired waveform generating circuit.
Figure 6B:
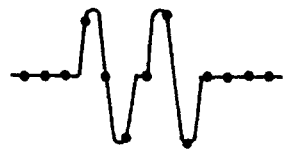
Figure 6C:
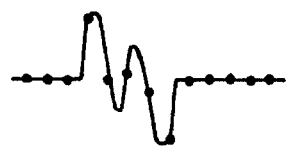
Figure 6D:
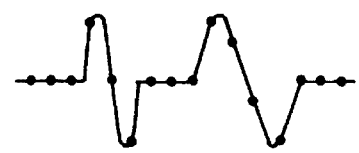

The transmitting waveform to be prepared by the desired waveform generating circuit 9 can be changed desirably by data generated by the CPU 13 shown in FIG. 4, with the result that for example, a desired waveform whose amplitude (ordinate) changes with time (abscissa) can be prepared by plotting data points which change with the lapse of time and connecting them as shown in FIG. 5. Under the direction of the sampling theorem, a transmitting pulse having a desired frequency can be generated provided that the desired frequency is within half a sampling frequency. FIGS. 6A to 6D are diagrams useful to explain examples of desired transmitting waveforms which can be prepared by the desired waveform generating circuit 9. FIG. 6A shows a waveform which is a one-wave-number transmitting waveform. FIG. 6B shows a waveform which is a two-wave-number transmitting waveform obtained by displacing one-wave-number transmitting waveforms from each other slightly on time axis. FIG. 6C shows a waveform obtained by partly overlapping two one-wave-number transmitting waveforms with each other. FIG. 6D shows a waveform which is a two-wave-number transmitting waveform obtained by slightly displacing two one-wave-number transmitting waveforms of different frequencies on time axis. The desired transmitting waveforms as shown in FIGS. 6A to 6D could not be prepared with the conventional ultrasonic wave transmitting circuit 6 shown in FIG. 1 which generated a transmitting waveform by switching the high voltage power supply by means of the driver circuit 8 and so imposed limitation on the switching speed.

Figure 7:
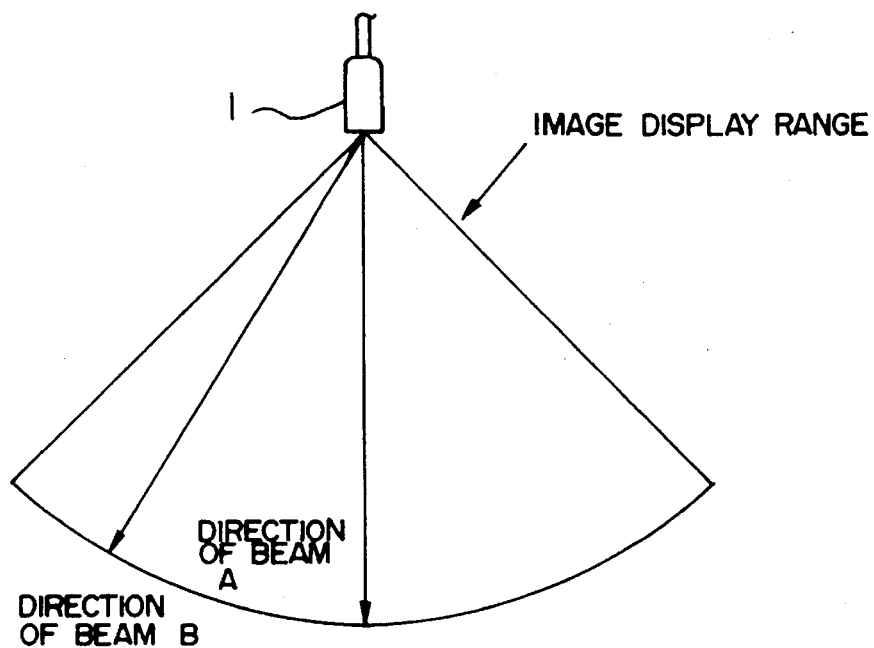
FIG. 7 is a diagram for explaining the operation when a sector probe for sector display is used to transmit waves simultaneously in two directions.
Figure 8:
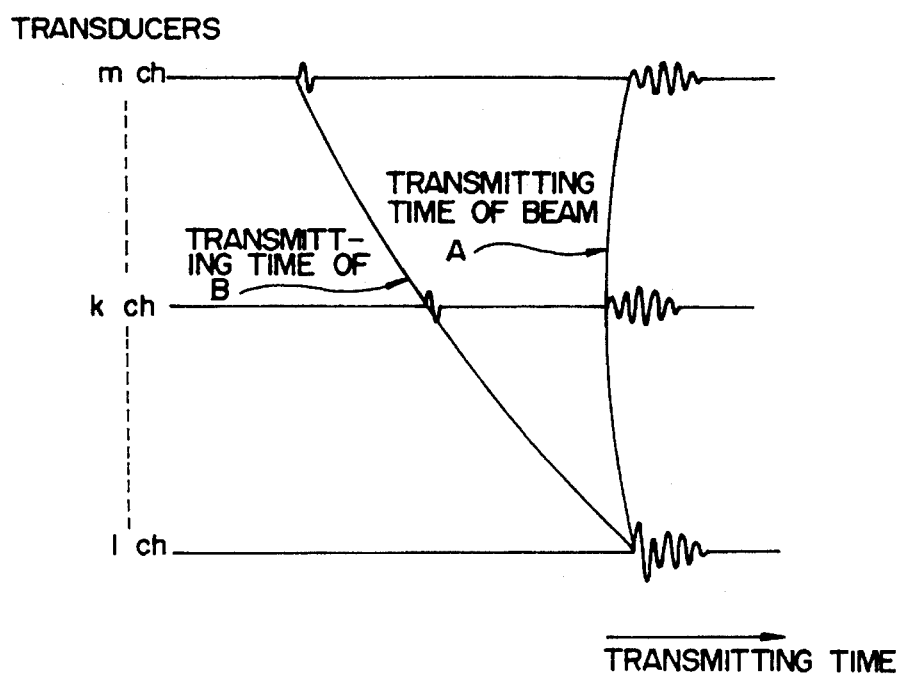
FIG. 8 is a diagram for explaining transmission timings for simultaneous wave transmission in two directions carried out with the sector probe.

As described above, by preparing desired transmitting waveforms as shown in FIGS. 6A to 6D and sending them to the probe 1 shown in FIG. 3 to drive it, ultrasonic waves can be transmitted simultaneously from the probe 1 in plural directions as shown in FIG. 7. FIG. 7 shows an instance where a sector probe for sector display is used in order that beams A and B are transmitted simultaneously in two directions. In this case, as shown in FIG. 8, the beams A and B are transmitted at transmitting timings defined by two kinds of transmitting times to permit the beams A and B to be transmitted simultaneously in two directions. In the instance of transmitting wave shown in FIG. 8, the beam A is a multiple-wave-number transmitting wave, the beam B is a one-wave-number transmitting wave and a transmitting wave resulting from superimposition of the two types of transmitting waves is transmitted from a transducer of the first channel. At the k-th and m-th channels, the two types of transmitting waves are transmitted at different timings. When these waves are transmitted in this manner, a monochromatic tomographic image can be obtained from the beam A and a Doppler image can be obtained from the beam B. As described above, the transmitting wave can be controlled in amplitude, frequency, wave number and waveform independently for the individual channels of the probe 1 depending on the modes of monochromatic tomographic image and Doppler image and waves can be transmitted simultaneously in a plurality of scanning line directions. While in FIGS. 7 and 8 simultaneous wave transmission in two directions is described, the present invention is in no way limited thereto and simultaneous wave transmission in three or more directions can also be ensured.

The desired waveform generating circuit 9 according to the present invention has been described as being applied to transmission of pulse waves but it may also be applied to transmission of continuous waves. In FIGS. 3 and 4, the ultrasonic transmitting circuit 2 includes the desired waveform generating circuits 9 which are equal in number to the channels (1 to m) of transducers in the probe 1. But the present invention is not limited thereto and a plurality of desired waveform generating circuits 9 may be provided by the number which is smaller than the number of channels of the probe 1 and the desired waveform generating circuits 9 may be switched by means of a switch circuit interposed between desired waveform generating circuit 9 and probe 1 so as to be connected sequentially to all of the channels of the probe 1. In this case, thanks to reduction in the number of the desired waveform generating circuits 9, the cost can be reduced.

With the present invention constructed as above, by using the plurality of desired waveform generating circuits included in the ultrasonic wave transmitting circuit, desired transmitting waveforms can be prepared independently for the individual channels of the probe and the probe can be driven with the transmitting waveforms. This permits the desired transmitting waveforms to drive the probe so as to transmit ultrasonic waves into an object to be examined. Accordingly, the transmitting wave can be controlled in amplitude, frequency, wave number and waveform independently for the individual channels of the probe depending on the modes of monochromatic tomographic image and Doppler image, with the result that irregularity in sensitivity of transducer prevailing between one channel and another can be eliminated and besides the individual channels can be weighted in terms of sensitivity. Also, since ultrasonic waves can be transmitted simultaneously in a plurality of scanning line directions, it is not necessary that transmission of waves be switched so that waves may be transmitted alternately in accordance with the mode of monochromatic tomographic image and Doppler image, and the frame rate of an obtained ultrasonic image can be improved. Further, since the transmitting wave can be changed in amplitude depending on the modes of monochromatic tomographic image and Doppler image, power can be raised up to a maximum level while ensuring safety in each mode and the sensitivity can be maximized. For the above reasons, according to the present invention, an image which is effectively used as a diagnostic image can be obtained.

We claim:

1. An ultrasonic diagnostic apparatus comprising:

a probe having a transducer array in which a great number of transducers are arrayed to form multiple channels;

a wave transmitting circuit for sending an ultrasonic wave transmitting signal string having a plurality of peaks to each channel of said probe and causing each channel to transmit an ultrasonic wave, said wave transmitting circuit setting at least the amplitude of each peak of the signal string desirably and independently;

a circuit for processing an ultrasonic receiving signal from said probe to form a desired image; and a display for displaying the image.

2. An ultrasonic diagnostic apparatus according to claim 1, wherein said wave transmitting circuit also sets the distance between adjacent peaks of the signal string desirably and independently.

3. An ultrasonic diagnostic apparatus according to claim 2, wherein said wave transmitting circuit includes:

means connected to each channel to store said wave transmitting signal;

means for forming a wave transmitting signal of a desired waveform;

means for writing the formed wave transmitting signal into said signal storing means; and means for controlling said storing means such that wave transmitting signals are applied substantially simultaneously to selected channels from storing means provided in association therewith.

4. An ultrasonic diagnostic apparatus according to claim 1, wherein said signal string has an envelope which increases gradually and thereafter decreases gradually.

5. An ultrasonic diagnostic apparatus according to claim 4, wherein said wave transmitting circuit generates said signal string by multiplying a string of peaks having a constant amplitude by a Gaussian weight.

6. An ultrasonic diagnostic apparatus according to claim 4, wherein said wave transmitting circuit generates said signal string by multiplying a string of peaks having a constant amplitude by a Hamming weight.

7. An ultrasonic diagnostic apparatus according to claim 1, wherein each channel includes a single transducer.

8. An ultrasonic diagnostic apparatus comprising:

a probe having a transducer array in which a great number of transducers are arrayed to form multiple channels;

means connected to said channels, respectively, to store wave transmitting signals;

means for forming a wave transmitting signal of a desired waveform;

means for writing the formed wave transmitting signal into said signal storing means;

means for controlling said storing means such that wave transmitting signals are applied substantially simultaneously from selected channels to storing means provided in association therewith;

means for processing an ultrasonic receiving signal from said probe to form a desired image; and means for displaying the image.

9. An ultrasonic diagnostic apparatus comprising:

a probe having a transducer array in which a great number of transducers are arrayed to form multiple channels;

a wave transmitting circuit for sending an ultrasonic wave transmitting signal string having a plurality of peaks to each channel and causing each channel to transmit an ultrasonic wave, said wave transmitting circuit changing at least the envelope of the signal string desirably;

a circuit for processing an ultrasonic receiving signal from said probe to form a desired image; and a display for displaying the image.

10. An ultrasonic diagnostic apparatus proper coupled with a probe having a transducer array in which a great number of transducers are arrayed to form multiple channels, comprising:

a wave transmitting circuit for sending an ultrasonic wave transmitting signal string having a plurality of peaks to each channel of said probe and causing each channel to transmit an ultrasonic wave, said wave transmitting circuit setting at least the width of each peak of the signal string desirably and independently;

a circuit for processing an ultrasonic receiving signal from said probe to form a desired image; and a display for displaying the image.

11. An ultrasonic diagnostic apparatus proper according to claim 10, wherein said wave transmitting circuit also sets the distance between adjacent peaks of said signal string desirably and independently.

12. An ultrasonic diagnostic apparatus proper according to claim 11, wherein said wave transmitting circuit includes:

means connected to each channel to store said wave transmitting signal;

means for forming a wave transmitting signal of a desired waveform;

means for writing the formed wave transmitting signal into said signal storing means; and means for controlling said storing means such that wave transmitting signals are applied substantially simultaneously to selected channels from storing means provided in association therewith.

13. An ultrasonic diagnostic apparatus proper according to claim 10, wherein said signal string has an envelope which increases gradually and thereafter decreases gradually.

14. An ultrasonic diagnostic apparatus proper according to claim 13, wherein said wave transmitting circuit generates said signal string by multiplying a string of peaks having a constant amplitude by a Gaussian weight.

15. An ultrasonic diagnostic apparatus proper according to claim 13, wherein said wave transmitting circuit generates said signal string by multiplying a string of peaks having a constant amplitude by a Hamming weight.

16. An ultrasonic diagnostic apparatus proper according to claim 10, wherein each channel includes a single transducer.

* * * * *